(12) United States Patent
Kamikawa et al.

(10) Patent No.: US 11,965,548 B2
(45) Date of Patent: Apr. 23, 2024

(54) DRIVE SHAFT AND METHOD OF PRODUCING DRIVE SHAFT

(71) Applicant: HONDA MOTOR CO., LTD., Tokyo (JP)

(72) Inventors: Mitsuru Kamikawa, Tokyo (JP); Takahiro Ueda, Tokyo (JP); Masafumi Yamamoto, Tokyo (JP); Masaru Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 624 days.

(21) Appl. No.: 17/191,742

(22) Filed: Mar. 4, 2021

(65) Prior Publication Data
US 2021/0277933 A1 Sep. 9, 2021

(30) Foreign Application Priority Data

Mar. 6, 2020 (JP) .................. 2020-038702

(51) Int. Cl.
F16C 3/02 (2006.01)
B23K 20/12 (2006.01)
F16D 1/068 (2006.01)

(52) U.S. Cl.
CPC ............ F16C 3/023 (2013.01); B23K 20/129 (2013.01); F16D 1/068 (2013.01);
(Continued)

(58) Field of Classification Search
CPC .......... B21K 1/06; B21K 1/063; B21K 1/066; B21K 1/10; B21K 1/12; B21K 20/12; B21K 20/129; B21K 20/22; B21K 20/227; B21K 2103/02; B21K 2103/04; B21K 2103/18; B21K 2103/20; B21K 2103/22; B21K 2103/24; B21K 2103/26; F16C 3/02; F16C 3/023; F16C 2204/64; F16C 2226/36;
(Continued)

(56) References Cited

U.S. PATENT DOCUMENTS 4,594,020 A   6/1986  Hughes
5,027,996 A * 7/1991  Fefeu ................. B21K 1/06
                                             228/114.5

(Continued)

FOREIGN PATENT DOCUMENTS

CN   101484266   7/2009
CN   101517098   8/2009
(Continued)

OTHER PUBLICATIONS

Chinese Office Action for Chinese Patent Application No. 202110246895.7 dated Nov. 1, 2023.

Primary Examiner — Josh Skroupa
(74) Attorney, Agent, or Firm — Amin, Turocy & Watson, LLP

(57) ABSTRACT

A drive shaft includes a first annular wall and a second annular wall joined together via a friction-welded portion. The first annular wall and the second annular wall have outer diameters of 30 to 50 mm and wall thicknesses of 3 to 5 mm. A burr created at the friction-welded portion has a connection radius of greater than or equal to 0.5 mm, a base radius of greater than or equal to 0.5 mm, a burr base angle of less than or equal to 40°, and a burr slope length of 0.2 to 5 mm.

9 Claims, 10 Drawing Sheets

(52) U.S. Cl.
CPC ...... *F16C 2204/64* (2013.01); *F16C 2226/36* (2013.01); *F16C 2326/06* (2013.01)

(58) Field of Classification Search
CPC ...... F16C 2326/06; F16D 1/027; F16D 1/068; Y10T 403/47
USPC .................................. 464/179, 183; 403/265
See application file for complete search history.

(56) References Cited

U.S. PATENT DOCUMENTS

| | | | |
|---|---|---|---|
| 6,105,849 A | 8/2000 | Mochizuki et al. | |
| 6,383,311 B1* | 5/2002 | Ochi ........................ | C22C 38/28 |
| | | | 148/328 |
| 6,913,105 B2* | 7/2005 | Masuda .................... | F16F 7/12 |
| | | | 464/167 |
| 6,981,919 B2* | 1/2006 | Sugiyama ............... | F16D 3/845 |
| | | | 464/146 |
| 9,005,039 B2* | 4/2015 | Yoshida .................. | F16D 1/027 |
| | | | 464/183 |
| 10,065,265 B2* | 9/2018 | Hara ........................ | B23K 33/006 |
| 10,132,357 B2* | 11/2018 | Kawarada ................. | F16C 3/02 |
| 10,221,895 B2* | 3/2019 | Suzuki .................... | F16D 1/027 |
| 10,539,193 B2* | 1/2020 | Shimasawa ............. | F16D 1/027 |
| 2005/0137022 A1* | 6/2005 | Neeley .................... | F16D 1/068 |
| | | | 464/111 |
| 2007/0199977 A1* | 8/2007 | Pollard ................... | F16D 1/027 |
| | | | 228/101 |
| 2009/0023506 A1* | 1/2009 | Kondo ..................... | F16C 3/02 |
| | | | 464/183 |
| 2009/0305077 A1 | 12/2009 | Mizuguchi et al. | |
| 2010/0040900 A1 | 2/2010 | Sumi et al. | |
| 2010/0062277 A1 | 3/2010 | Sato et al. | |
| 2016/0123405 A1* | 5/2016 | Feichter .................. | F16C 3/023 |
| | | | 464/127 |

FOREIGN PATENT DOCUMENTS

| | | | | |
|---|---|---|---|---|
| CN | 102171552 | | 8/2011 | |
| CN | 108472762 | | 8/2018 | |
| DE | 102010026760 A1 | * | 1/2012 | ............... F16C 3/02 |
| EP | 0793030 A2 | * | 9/1997 | ............. F16C 3/023 |
| JP | 2001-287052 | | 10/2001 | |
| JP | 2008-055486 | | 3/2008 | |
| JP | 2008-87003 | | 4/2008 | |
| WO | 2008/010265 A1 | | 12/2009 | |
| WO | WO-2010044473 A1 | * | 4/2010 | ............ B23K 20/12 |
| WO | WO-2012032926 A1 | * | 3/2012 | ............ F16D 1/068 |

* cited by examiner (16)

(18)

DRIVE SHAFT AND METHOD OF PRODUCING DRIVE SHAFT

CROSS-REFERENCE TO RELATED APPLICATION

This application is based upon and claims the benefit of priority from Japanese Patent Application No. 2020-038702 filed on Mar. 6, 2020, the contents of which are incorporated herein by reference.

BACKGROUND OF THE INVENTION

Field of the Invention

The present invention relates to drive shafts for transmitting driving force for traveling generated by driving-force generating mechanisms to wheels in automobiles and relates to methods of producing such drive shafts.

Description of the Related Art

Drive shafts of automobiles need to be lightweight and, at the same time, need to have excellent rigidity at ends to which, for example, constant velocity joints are attached. To meet these demands, a drive shaft configured as a joint body including a hollow tubular body and solid stub shafts joined together is proposed in, for example, Japanese Laid-Open Patent Publication No. 2008-087003. That is, the drive shaft includes the hollow tubular body in the midsection except for end parts so that the weight of the drive shaft is reduced. In addition, the drive shaft includes the solid stub shafts at the end parts to achieve high rigidity.

The hollow tubular body and the solid stub shafts may be joined together by, for example, friction welding. In this case, first annular portions provided at both end parts of the hollow tubular body and second annular portions with an annular shape substantially identical to that of the first annular portions provided at end parts of the solid stub shafts are friction-welded to each other. As a result, the hollow tubular body and the solid stub shafts are joined together via friction-welded portions formed between the first annular portions and the second annular portions.

SUMMARY OF THE INVENTION

Burrs are created at the friction-welded portions. The burrs created on the outer circumferential surfaces of the first annular portions and the second annular portions can be removed from outside the drive shaft by performing machine work or the like. However, the burrs created on the inner circumferential surfaces of the first annular portions and the second annular portions cannot be removed from outside the drive shaft and remain on the product of the drive shaft. Depending on the shape of the burrs, stress concentration may occur at, for example, basal end portions of the burrs from which the burrs are raised, and may reduce the fatigue strength of the drive shaft.

The present invention has been devised taking into consideration the aforementioned problem, and has the object of providing a drive shaft, with excellent fatigue and torsional strength, and a method of producing such a drive shaft.

According to an aspect of the present invention, a drive shaft includes a first annular wall with an annular shape provided at an end part of a hollow tubular body made of a medium carbon steel and a second annular wall with an annular shape provided at an end part of a solid stub shaft made of a medium carbon steel, the first and second annular walls being joined together in an axial direction via a friction-welded portion, wherein the first annular wall and the second annular wall have outer diameters of 30 to 50 mm and wall thicknesses of 3 to 5 mm, at the friction-welded portion, a burr is partially raised from a first inner wall surface, which is an inner wall surface of the first annular wall, and from a second inner wall surface, which is an inner wall surface of the second annular wall, the burr includes a burr base part, which is a basal end at which the burr is raised from the first inner wall surface, and an orthogonal part orthogonal to the first inner wall surface, a connection radius r, which is a radius of curvature of the burr base part, is greater than or equal to 0.5 mm, a base radius R, which is a minimum radius of curvature of a part between the burr base part and the orthogonal part of the burr, is greater than or equal to 0.5 mm, a burr base angle θ, which is an angle of inclination of the burr base part relative to the first inner wall surface, is less than or equal to 40°, and a burr slope length L, which is an axial length of the part between the burr base part and the orthogonal part, is in a range of 0.2 to 5 mm.

According to another aspect of the present invention, a method of producing a drive shaft is provided. The drive shaft includes a first annular wall with an annular shape provided at an end part of a hollow tubular body made of a medium carbon steel and a second annular wall with an annular shape provided at an end part of a solid stub shaft made of a medium carbon steel, the first and second annular walls being joined together in an axial direction via a friction-welded portion to obtain the drive shaft, and the method includes a forging step of obtaining the solid stub shaft by cold forging and a friction-welding step of joining the first annular wall and the second annular wall together by friction welding, the first annular wall and the second annular wall having outer diameters of 30 to 50 mm and wall thicknesses of 3 to 5 mm, wherein in the friction-welding step, the friction-welded portion is formed in a manner that a burr is partially raised from a first inner wall surface, which is an inner wall surface of the first annular wall, and from a second inner wall surface, which is an inner wall surface of the second annular wall; that the burr includes a burr base part, which is a basal end at which the burr is raised from the first inner wall surface, and an orthogonal part orthogonal to the first inner wall surface; that a connection radius r, which is a radius of curvature of the burr base part, is greater than or equal to 0.5 mm; that a base radius R, which is a minimum radius of curvature of a part between the burr base part and the orthogonal part of the burr, is greater than or equal to 0.5 mm; that a burr base angle θ, which is an angle of inclination of the burr base part relative to the first inner wall surface, is less than or equal to 40°; and that a burr slope length L, which is an axial length of the part between the burr base part and the orthogonal part, is in a range of 0.2 to 5 mm.

In the drive shaft, the shape of the burr created at the friction-welded portion is set as above. This prevents stress concentration on the burr and thus improves the fatigue strength of the drive shaft. Moreover, the hollow tubular body and the solid stub shaft are joined together via the friction-welded portion in a preferred manner, increasing the torsional strength of the drive shaft.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
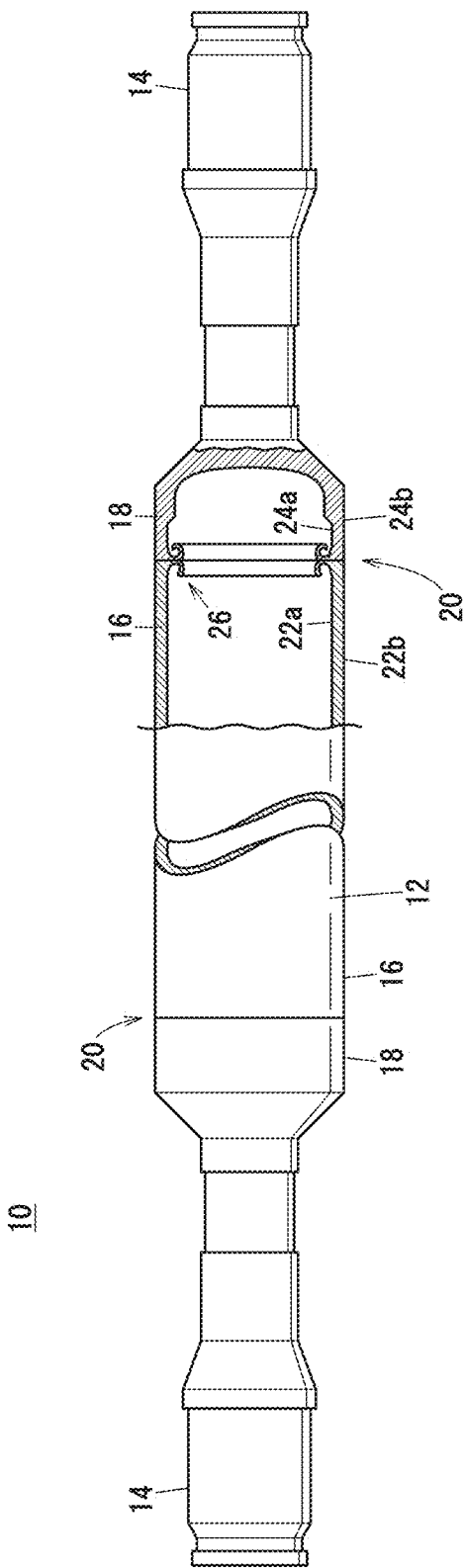
FIG. 1 is a side view, partially sectioned in a longitudinal direction, of a drive shaft according to an embodiment of the present invention.

Preferred embodiments of a drive shaft and a method of producing a drive shaft according to the present invention will be presented and described in detail below with reference to the accompanying drawings. In the drawings, the same reference numbers and symbols are used for components having identical or similar functions and effects, and the repeated descriptions may be omitted.

As illustrated in FIG. 1, a drive shaft 10 includes a hollow tubular body 12 and solid stub shafts 14 integrated with either axial end of the hollow tubular body 12. The hollow tubular body 12 is provided with a first annular wall 16 at either end part. Each of the solid stub shafts 14 is provided with a second annular wall 18 at an end part. The second annular walls 18 have a shape substantially identical to the shape of the first annular walls 16.

The first annular walls 16 and the second annular walls 18 have outer diameters of 30 to 50 mm and wall thicknesses of 3 to 5 mm. The first annular walls 16 are friction-welded to the respective second annular walls 18 in the axial direction, thereby the hollow tubular body 12 and the solid stub shafts 14 are joined together via friction-welded portions 20 formed between the first annular walls 16 and the second annular walls 18. The friction-welded portions 20 at both axial ends of the hollow tubular body 12 are substantially identical to each other.

Figure 2:
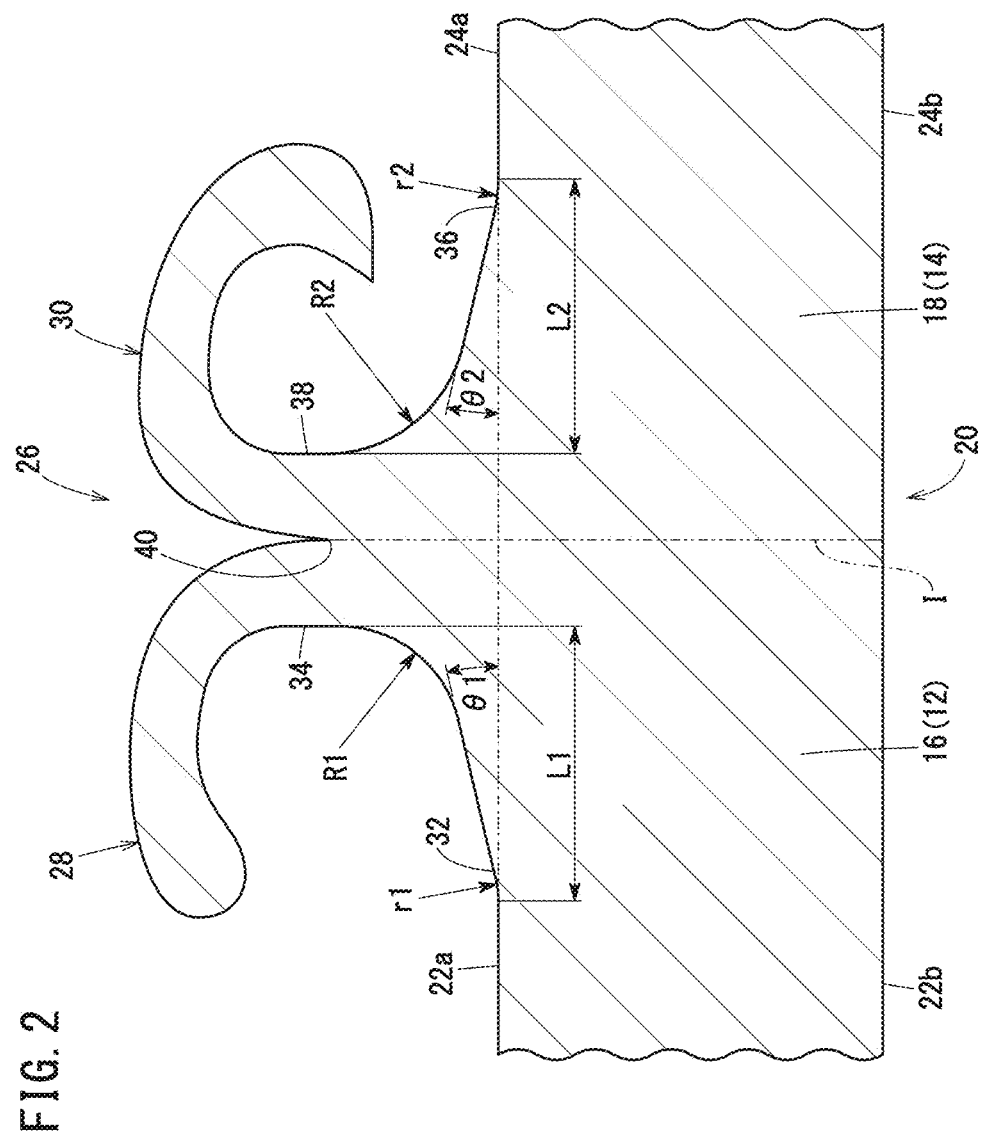
FIG. 2 is a schematic view of a principal part illustrating the shape of a burr.

As illustrated in FIG. 2, at each of the friction-welded portions 20, a burr 26 is partially raised from a first inner wall surface 22a, which is the inner wall surface of the first annular walls 16, and from a second inner wall surface 24a, which is the inner wall surface of the second annular walls 18. Specifically, the burr 26 includes a first curved portion 28 and a second curved portion 30. The first curved portion 28 is raised from the first inner wall surface 22a and is curved away from the second inner wall surface 24a in the axial direction. The second curved portion 30 is raised from the second inner wall surface 24a and is curved away from the first inner wall surface 22a in the axial direction.

The first curved portion 28 includes a burr base part 32, which is a basal end at which the first curved portion 28 is raised from the first inner wall surface 22a, and an orthogonal part 34 orthogonal to the first inner wall surface 22a. A connection radius r1 (connection radius r), which is the radius of curvature of the burr base part 32, is preferably in the range of 0.5 to 3 mm. A base radius R1 (base radius R), which is the minimum radius of curvature of a part between the burr base part 32 and the orthogonal part 34 of the burr 26, is preferably in the range of 0.5 to 2.5 mm. A burr base angle θ1 (burr base angle θ), which is the angle of inclination of the burr base part 32 relative to the first inner wall surface 22a, is less than or equal to 40°. A burr slope length L1 (burr slope length L), which is the axial length of the part between the burr base part 32 and the orthogonal part 34, is in the range of 0.2 to 5 mm.

The second curved portion 30 includes a burr base part 36, which is a basal end at which the second curved portion 30 is raised from the second inner wall surface 24a, and an orthogonal part 38 orthogonal to the second inner wall surface 24a. A connection radius r2, a base radius R2, a burr base angle θ2, and a burr slope length L2 in the second curved portion 30 are not particularly limited, but are preferably set substantially equal to the connection radius r1, the base radius R1, the burr base angle θ1, and the burr slope length L1, respectively, in the first curved portion 28.

Figure 3:
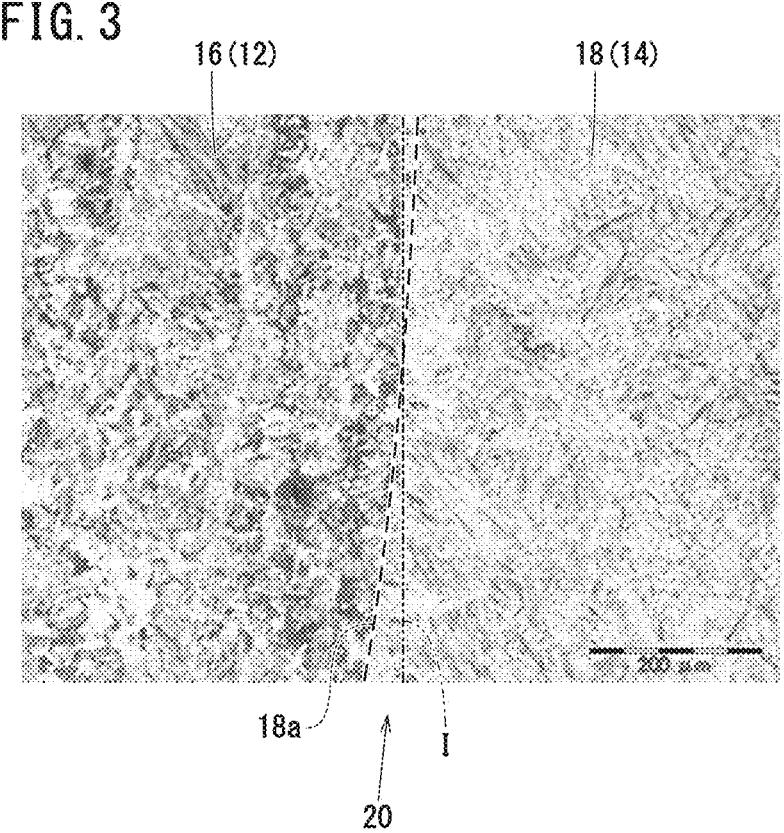
FIG. 3 is a photomicrograph of a first annular wall and a second annular wall at a friction-welded portion.

A valley bottom portion 40 is formed between the first curved portion 28 and the second curved portion 30. A virtual line passing through the valley bottom portion 40 in a radial direction of the first annular wall 16 and the second annular wall 18 is defined as a virtual centerline I. As illustrated in FIG. 3, at the friction-welded portion 20, an axial end part 18a of the second annular wall 18 expands toward the first annular wall 16 beyond the virtual centerline I by 1 to 30 μm.

In this embodiment, the hollow tubular body 12 in FIG. 1 is made of a medium carbon steel. As a suitable example, the medium carbon steel contains, by weight, 0.43 to 0.47% carbon (C), 0.30% or less silicon (Si), 0.60 to 0.90% manganese (Mn), 0.010% or less phosphorus (P), 0.020% or less sulfur (S), 0.1% or less copper (Cu), 0.1% or less nickel (Ni), 0.05% or less chromium (Cr), and 0.02 to 0.04% aluminum (Al), and the rest consists of iron (Fe) and unavoidable impurities. When expressed in grain size number in accordance with ASTM E112, the grain size of the medium carbon steel ranges from #5 to #9.

The solid stub shafts 14 in FIG. 1 are also made of a medium carbon steel. As a suitable example, the medium carbon steel contains, by weight, 0.45 to 0.51% C, 0.25% or less Si, 0.30 to 0.50% Mn, 0.010% or less P, 0.008 to 0.020% S, 0.1% or less Cu, 0.1% or less Ni, 0.1 to 0.2% Cr, at least one of 0.05 to 0.25% molybdenum (Mo), 0.03 to 0.08% niobium (Nb), and 0.01 to 0.05% titanium (Ti), 0.02 to 0.04% Al, and 10 to 30 ppm boron (B), and the rest consists of Fe and unavoidable impurities.

That is, the medium carbon steel serving as the material of the solid stub shafts 14 contains more Mo, Nb, and/or Ti than the medium carbon steel serving as the material of the hollow tubular body 12. When expressed in grain size number in accordance with ASTM E112, the grain size of the medium carbon steel making up the solid stub shafts 14 ranges from #9 to #11.

Figure 4:
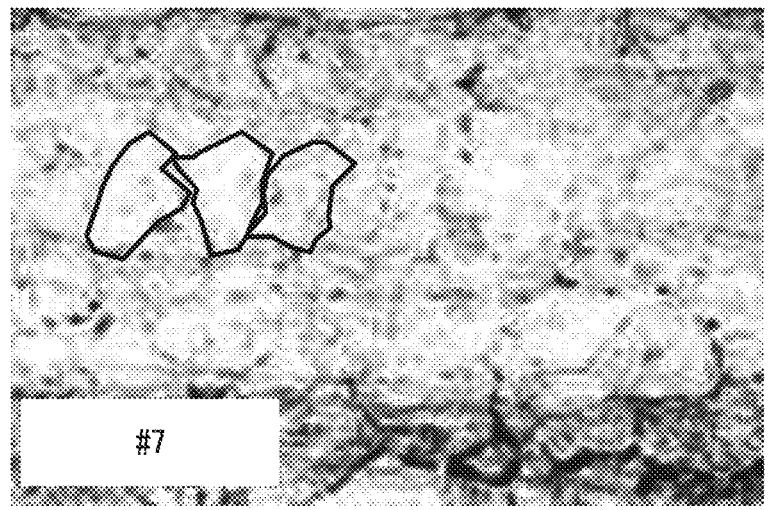
FIG. 4 is a photomicrograph of a hollow tubular body (first annular wall) at the friction-welded portion.
Figure 5:
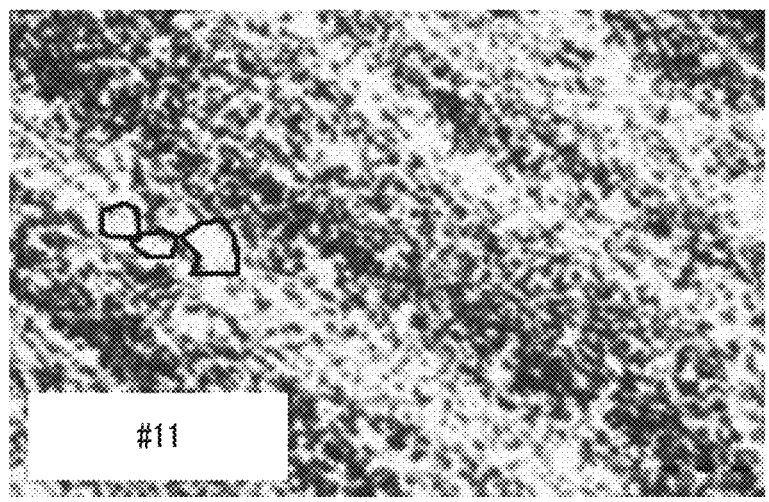
FIG. 5 is a photomicrograph of a solid stub shaft (second annular wall) at the friction-welded portion.

The contour lines in FIGS. 4 and 5 indicate grain boundaries. When expressed in the grain size number in accordance with ASTM E112, the grain size of the hollow tubular body 12 (first annular wall 16) at the friction-welded portion 20, determined on the basis of the magnification of the photomicrograph and the measurements of the contour lines in FIG. 4, ranged from #5 to #9. When expressed in the grain size number in accordance with ASTM E112, the grain size of the solid stub shaft 14 (second annular wall 18) at the friction-welded portion 20, determined on the basis of the magnification of the photomicrograph and the measurements of the contour lines in FIG. 5, ranged from #10 to #12. It is clear from the results that the grains of both the solid stub shafts 14 and the hollow tubular body 12 in FIG. 1 became finer at the friction-welded portions 20.

As a result of analyzing areas adjacent to the grain boundaries at the friction-welded portion 20, the existence of $Mo_2C$, NbC, and TiC serving as deposited particles was acknowledged in the grain boundaries in the metal structure of, in particular, the second annular wall 18. From this, it can be surmised that $Mo_2C$, NbC, and TiC prevented grain growth.

Figure 6:
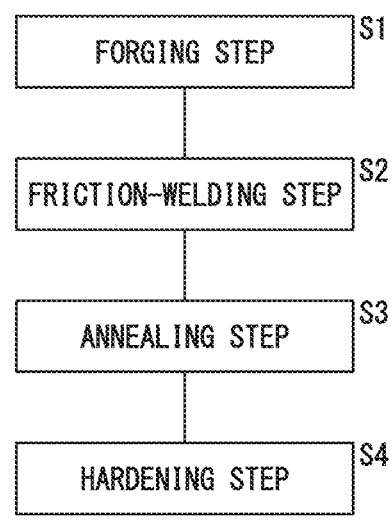
FIG. 6 illustrates a schematic flow of a method of producing a drive shaft according to an embodiment of the present invention.

Next, a method of producing the drive shaft 10 according to an embodiment will be described on the basis of a schematic flow illustrated in FIG. 6. The production method includes a forging step S1 of obtaining the solid stub shafts 14, a friction-welding step S2 of joining the hollow tubular body 12 and the solid stub shafts 14 together by friction welding, an annealing step S3, and a hardening step S4.

As the material for obtaining the solid stub shafts 14, the medium carbon steel with the composition described above is suitable. The steel material made of the medium carbon steel is rolled at a temperature of 850° C. or less. Due to the rolling in the temperature range, strains remain in the steel material. Ferrite deposits from uneven parts in which the strains remain while austenite transforms to ferrite. This results in a soft, easily shapeable structure made of fine grains.

Subsequently, the steel material is spheroidized. To do this, the steel material may be maintained at, for example, 720 to 760° C. for a predetermined period of time and then cooled slowly at a cooling speed of 0.5° C./min or less down to 600° C. This promotes spheroidization of cementite ($Fe_3C$), and the steel material obtains a structure containing a significant amount of relatively soft ferrite.

Next, the spheroidized steel material is cold-forged in the forging step S1. Cold forging prevents grain coarsening. In other words, the grains are kept fine before and after cold forging. In addition, the steel material can be easily shaped into the solid stub shafts 14 even by cold forging since the steel material is soft.

Figure 7:
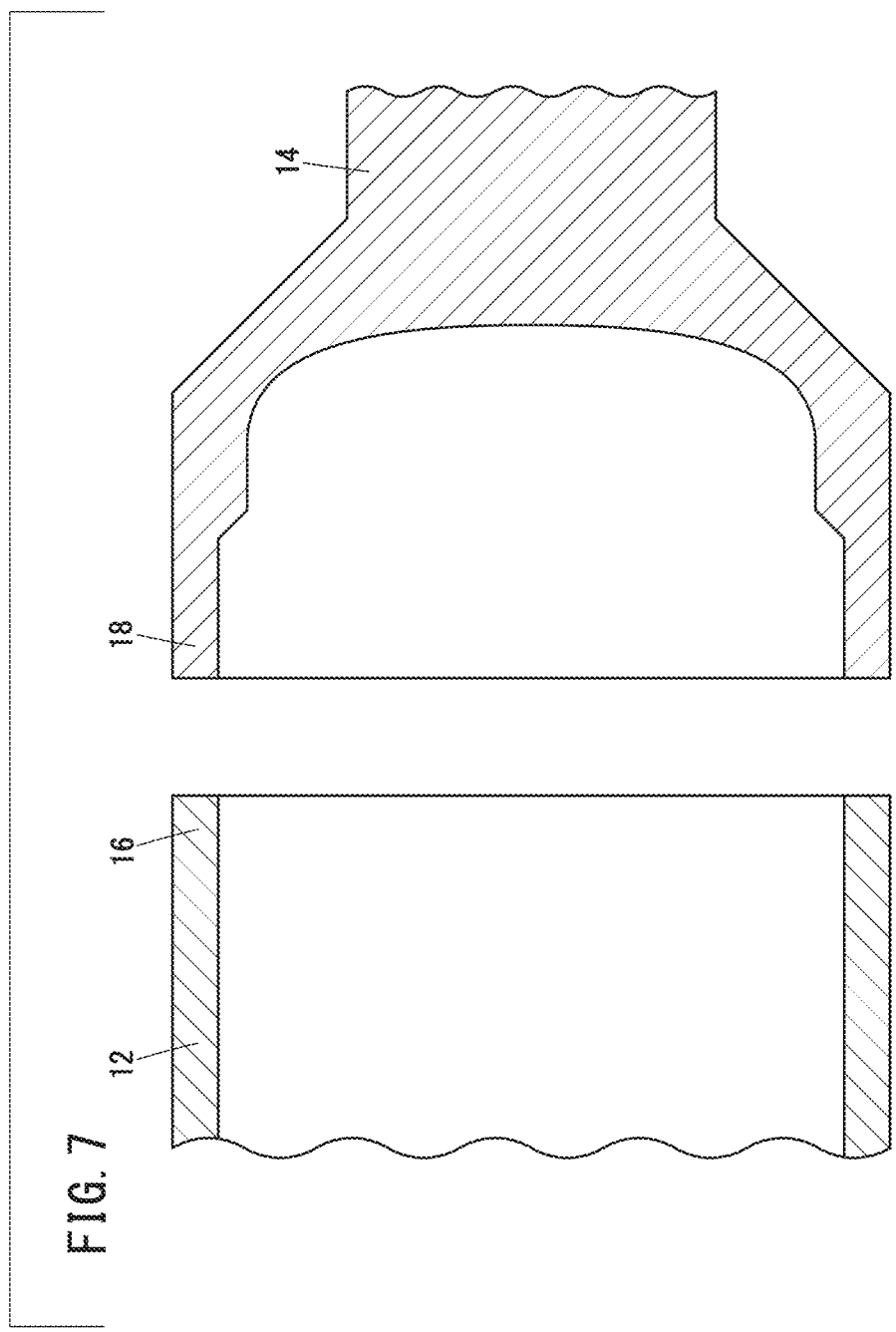
FIG. 7 is a schematic cross-sectional view of a principal part of a hollow tubular body and a solid stub shaft before friction welding.

Next, the friction-welding step S2 is performed. The friction-welding step S2 can be performed in accordance with, for example, JIS Z 3607. In the friction-welding step S2, for example, the solid stub shaft 14 in FIG. 7 is rotated while being held by a rotatable holder (not illustrated); on the other hand, the hollow tubular body 12 in FIG. 7 is held by a propellable holder (not illustrated). After the number of rotations of the solid stub shaft 14 reaches a predetermined value (for example, 2.5 to 10 m/s), the hollow tubular body 12 is coaxially brought into contact with the solid stub shaft 14 by the propellable holder. This pressure welding of the first annular wall 16 and the second annular wall 18 causes frictional pressure to be applied to the joint interface between the annular walls and thus causes the joint interface to be heated by frictional heat. The frictional pressure at this moment is set to, for example, 20 to 60 MPa.

When the joint interface becomes soft at a desired level due to the temperature rise by the frictional heat, the rotation of the solid stub shaft 14 by the rotatable holder is stopped. At the time when the rotation of the solid stub shaft 14 stops, the hollow tubular body 12 is propelled toward the solid stub shaft 14 by the propellable holder. This adds an upset pressure of, for example, 50 to 200 MPa to the joint interface.

Figure 8:
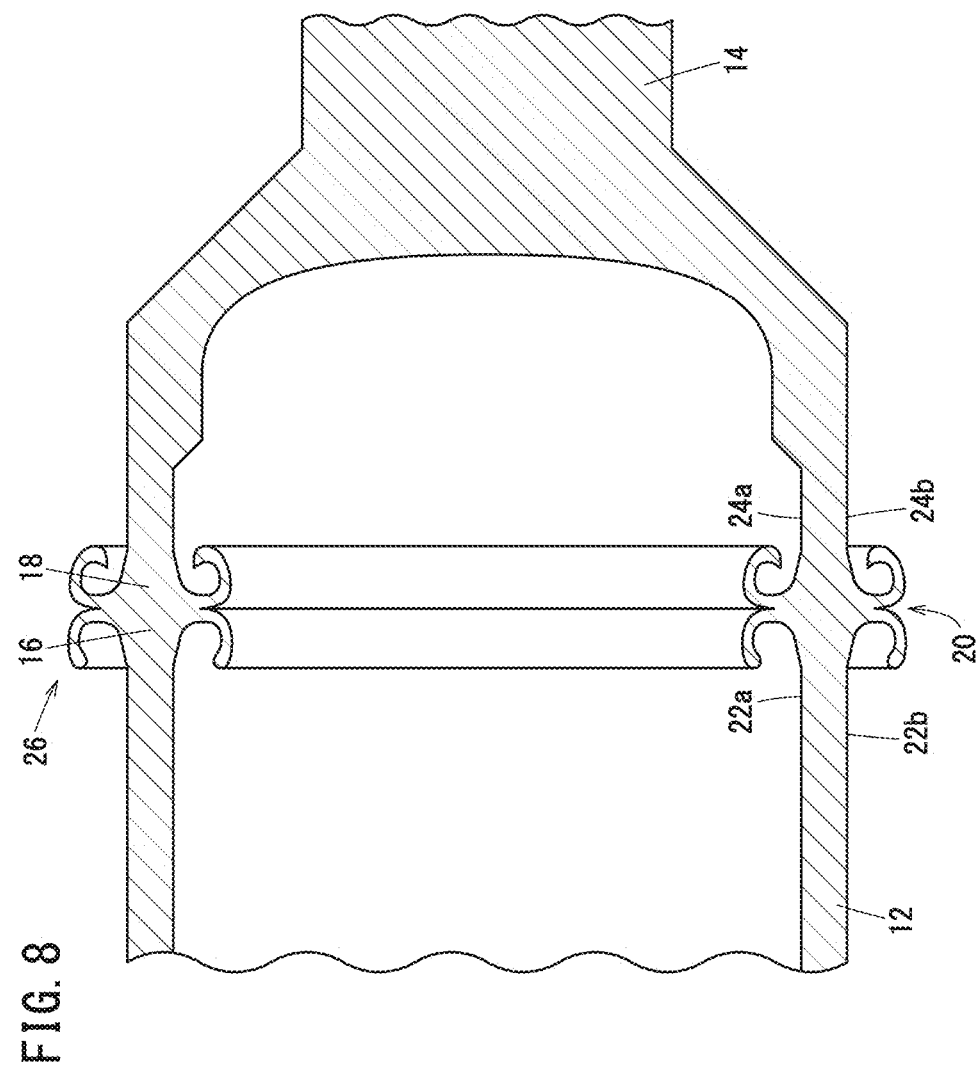
FIG. 8 is a schematic cross-sectional view of the principal part of the hollow tubular body and the solid stub shaft after friction welding.

As a result, as illustrated in FIG. 8, the first annular wall 16 and the second annular wall 18 are solid-state bonded to each other via the friction-welded portion 20. At this moment, part of the first annular wall 16 and the second annular wall 18 is discharged from the joint interface inward and outward in a radial direction of the friction-welded portion 20 by plastic flow. This creates burrs 26 raised from the first inner wall surface 22a of the first annular wall 16 and the second inner wall surface 24a of the second annular wall 18 and from a first outer wall surface 22b of the first annular wall 16 and a second outer wall surface 24b of the second annular wall 18 at the friction-welded portion 20.

In the friction-welding step S2, friction-welding conditions including the number of rotations, the frictional pressure, and the upset pressure described above are set such that the surface temperatures, increased by the frictional heat, of the first annular wall 16 and the second annular wall 18 at an area adjacent to the joint interface reach 800 to 870° C. In this case, the estimated internal temperatures of the first annular wall and the second annular wall at the area adjacent to the joint interface reach 700° C. This causes at least one of $Mo_2C$, NbC, and Tic to deposit in the grain boundaries in the metal structure of, in particular, the second annular wall 18.

The deposits of $Mo_2C$, NbC, and TiC in the grain boundaries prevent grain coarsening by the pinning effect and thereby improve the strength of the grain boundaries. As a result, the first annular wall 16 and the second annular wall 18 are hardened at the friction-welded portion 20, and the strength and the proof stress under high temperature of about, for example, 600° C. are improved as well.

The above-described deposits in, in particular, the second annular wall 18 make the second annular wall 18 harder than the first annular wall 16. Because of this, the first annular wall 16, which is deformable more easily than the second annular wall 18, deforms so as to cover the second annular wall 18. As a result, as illustrated in FIG. 3, the axial end part 18a of the second annular wall 18 expands toward the first annular wall 16 beyond the virtual centerline I by 1 to 30 μm at the friction-welded portion 20, and thereby the first annular wall 16 and the second annular wall 18 are firmly joined together.

In the friction-welding step S2 described above, the second annular walls 18 of the solid stub shafts 14 are friction-welded to the first annular walls 16 at both axial ends of the hollow tubular body 12. Note that, in the friction-welding step S2, the hollow tubular body 12 may be held by the rotatable holder, and the solid stub shafts 14 may be held by the propellable holder.

Next, the annealing step S3 is performed. That is, the drive shaft 10 is heated to a predetermined temperature. The annealing step S3 removes the strains that have occurred during friction welding and promotes recrystallization. The recrystallized grains become as fine as about 20 μm. Moreover, NbC, TiC, $Mo_2C$, or the like also deposits in the grain boundaries in the annealing step S3. Due to the finer grains and the deposit of carbides in the grain boundaries, the friction-welded portions 20 attain an excellent strength. It is preferable that the annealing temperature be in the range of 650 to 720° C. and maintained for 30 to 90 minutes.

Next, predetermined machine work is performed on the drive shaft 10 to remove the burrs 26 created on the outer circumferences of the friction-welded portions 20 in, for example, FIG. 8. That is, the burrs 26 raised from the first outer wall surfaces 22b of the first annular walls 16 and the second outer wall surfaces 24b of the second annular walls 18 are removed. As a result, as illustrated in FIGS. 1 and 2, the friction-welded portions 20 only include the burrs 26 including the first curved portions 28 and the second curved portion 30 respectively raised from the first inner wall surfaces 22a of the first annular walls 16 and the second inner wall surfaces 24a of the second annular walls 18.

By setting the friction-welding conditions in the friction-welding step S2 as above, each of the first curved portions 28 has the connection radius r1 of 0.5 to 3 mm, the base radius R1 of 0.5 to 2.5 mm, the burr base angle θ1 of 40° or less, and the burr slope length L1 of 0.2 to 5 mm as illustrated in FIG. 2.

Next, the hardening step S4 is performed on the drive shaft 10 shaped as above to obtain a product of the drive shaft 10 in FIG. 1. In the hardening step S4, induction hardening is preferably performed as it has various advantages including excellent thermal efficiency. In the induction hardening, the drive shaft 10 is subjected to high-frequency heating and then quenched. During the quenching, heat is prevented from remaining in the burrs 26 as the burrs 26 on the friction-welded portions 20 have the above-described shape. This prevents variations in hardness and quenching cracks in the friction-welded portions 20.

In the hardening step S4, the overall drive shaft 10 can be hardened. In this step, hardening easily progresses in the solid stub shafts 14 made of the medium carbon steel with the above-described composition compared with other medium carbon steels, and hardened layers with sufficient depths can be formed.

The medium carbon steel serving as the material of the solid stub shafts 14 has excellent hardenability as described above. For this reason, hardened layers with predetermined depths can be reliably formed in the solid stub shafts 14 even when hardening is performed under conditions for forming hardened layers with sufficient depths particularly in the hollow tubular body 12, which is thinner than the solid stub shafts 14. That is, grains in the structure of the hollow tubular body 12 subjected to hardening are prevented from coarsening. Consequently, by hardening, the strength of the hollow tubular body 12 can be improved while grain coarsening is prevented.

As the strength of the hollow tubular body 12 is increased by hardening, the outer diameter or thickness of the hollow tubular body 12 does not need to be increased. The weight of the drive shaft 10 can be reduced accordingly. Moreover, since the hollow tubular body 12 is not exposed to excessive heating, quenching cracks in the drive shaft 10 can be prevented.

In addition, the drive shaft 10 includes fine grains at the friction-welded portions 20 and carbides depositing in the grain boundaries. The carbides produce a so-called particle dispersion strengthening effect. For the above-described reasons, the friction-welded portions 20 have excellent strength and toughness.

Moreover, since the hollow tubular body 12 is lightweight, the weight of the drive shaft 10 can be reduced. That is, in this embodiment, although the drive shaft 10 is formed by joining the hollow tubular body 12 and the solid stub shafts 14 together, the drive shaft 10 has a sufficient strength while being lightweight.

In the drive shaft 10 and the method of producing the drive shaft 10 according to the embodiments above, each of the burrs 26 has, relative to the first inner wall surface 22a of the friction-welded portion 20, the connection radius r1 of greater than or equal to 0.5 mm, the base radius R1 of greater than or equal to 0.5 mm, the burr base angle θ1 of less than or equal to 40°, and the burr slope length L1 of 0.2 to 5 mm.

The friction-welding conditions for creating the burr 26 with the above-described shape can be determined as follows. That is, for example, friction-welding conditions for testing are set, and the friction-welded portions 20 are formed using the friction-welding conditions for testing. The friction-welded portions 20 are observed under a microscope to measure the connection radius r1, the base radius R1, the burr base angle θ1, and the burr slope length L1. Then, the friction-welding conditions for obtaining the connection radius r1, the base radius R1, the burr base angle θ1, and the burr slope length L1 within the above-described ranges are determined from the measured values and the friction-welding conditions for testing.

Figure 9:
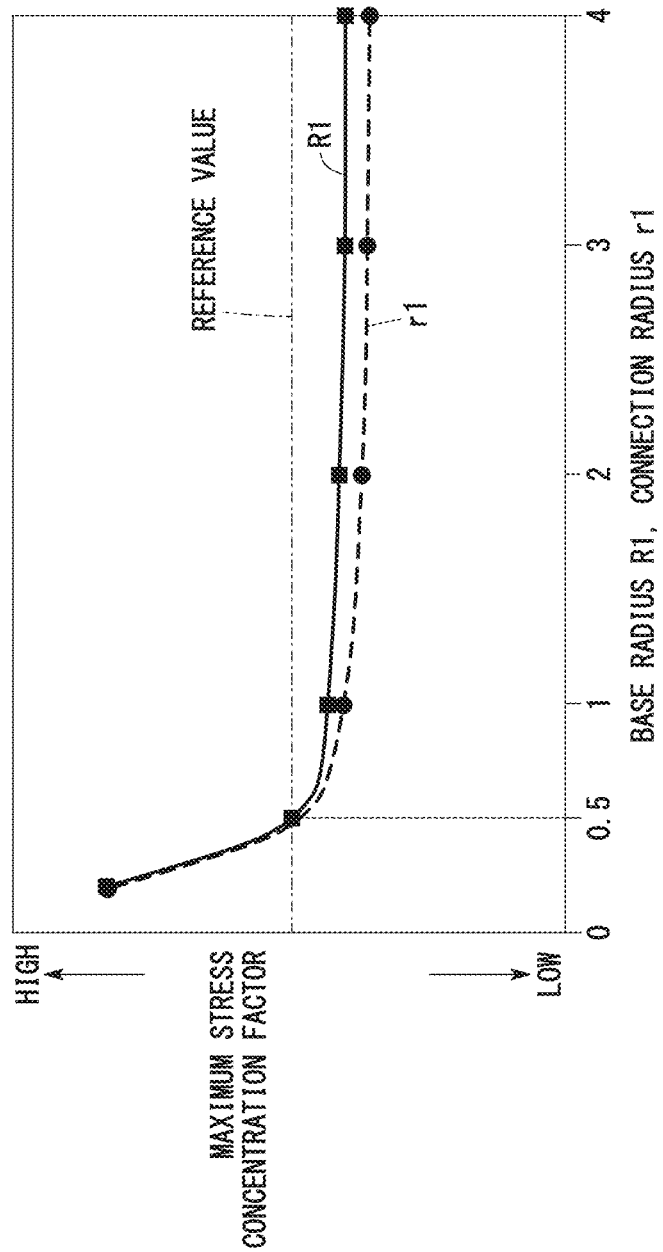
FIG. 9 illustrates relationships between a connection radius r and a base radius R and the maximum stress concentration factor of a burr.

FIG. 9 illustrates the results obtained by performing the copper plating stress measurement method to determine the relationships between the sizes of the connection radius r1 and the base radius R1 and the maximum stress concentration factor of the burr 26. In the copper plating stress measurement method, first, the friction-welding conditions for forming multiple friction-welding test pieces with different sizes of the connection radius r1 and the base radius R1 were determined as above. Then, the maximum stress concentration factor of the friction-welding test pieces produced on the basis of the friction-welding conditions was measured by the stress measurement method.

As illustrated in FIG. 9, it was found that the maximum stress concentration factor was less than or equal to a reference value when the connection radius r1 and the base radius R1 were greater than or equal to 0.5 mm. It can be said that, when the maximum stress concentration factor is less than or equal to the reference value, stress concentration on the burr 26 while the drive shaft 10 is in use can be sufficiently prevented. Thus, when the connection radius r1 and the base radius R1 are greater than or equal to 0.5 mm, stress concentration on the burr 26 can be prevented, and thus the fatigue strength of the drive shaft 10 can be improved.

Figure 10:
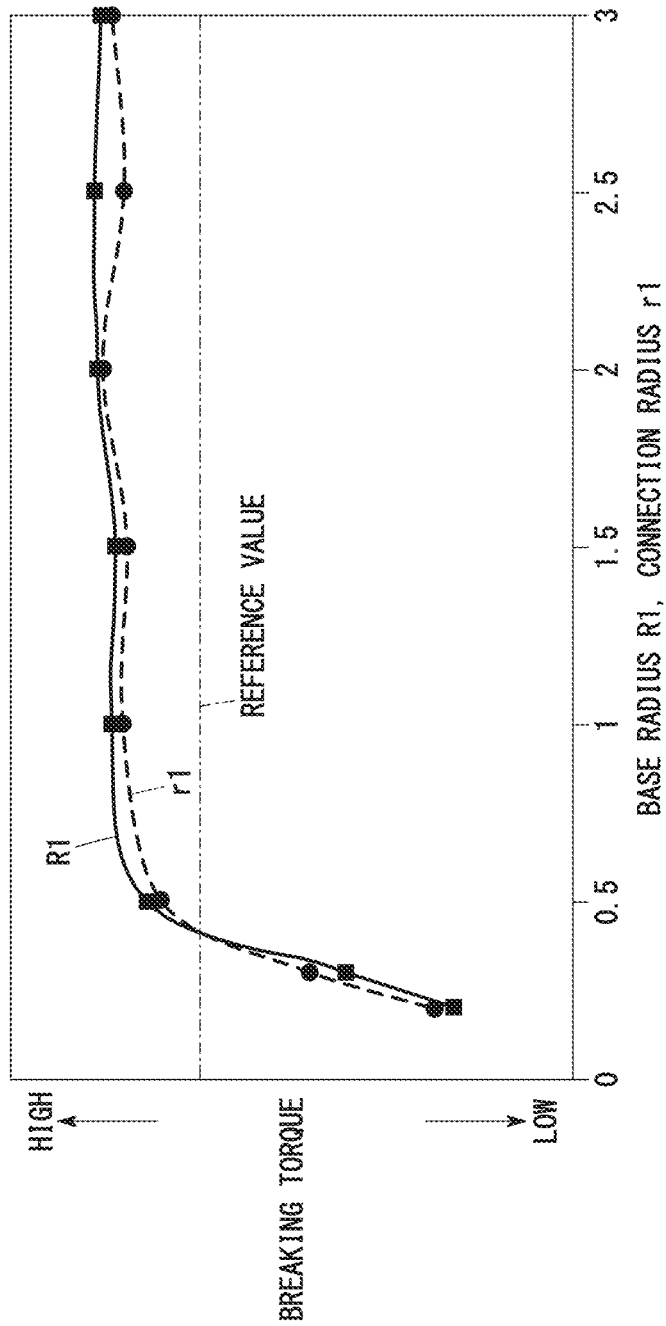
FIG. 10 illustrates relationships between the connection radius r and the base radius R and the breaking torque of the burr.

FIG. 10 illustrates the results of computer-aided engineering (CAE) simulation performed to determine the relationships between the sizes of the connection radius r1 and the base radius R1 and the breaking torque of the drive shaft 10. From FIG. 10, it has been found that the breaking torque exceeds a reference value of the breaking torque required as the drive shaft 10 when the connection radius r1 and the base radius R1 are greater than or equal to 0.5 mm. Thus, the torsional strength of the drive shaft 10 can be satisfactorily improved when the connection radius r1 and the base radius R1 are greater than or equal to 0.5 mm.

In the drive shaft 10, the connection radius r1 and the base radius R1 of greater than or equal to 0.5 mm can be easily obtained when the burr base angle θ1 is less than or equal to 40°. Moreover, a bead portion, which is created as a result of solidification of the joint interface softened by frictional heat in the friction-welding step S2, has a sufficient size when the burr slope length L1 is greater than or equal to 0.2 mm. As a result, the connection radius r1 of greater than or equal to 0.5 mm can be easily obtained, and the joint strength can be increased at the friction-welded portion 20.

As described above, the first annular wall 16 and the second annular wall 18 have outer diameters of 30 to 50 mm and wall thicknesses of 3 to 5 mm. Accordingly, the joint allowance required for friction welding is only about 5 mm. Thus, an unnecessary increase in the joint allowance for friction welding can be prevented when the burr slope length L1 is less than or equal to 5 mm. This leads to a reduction in the rates of materials of the first annular wall and the second annular wall used to form the friction-welded portion 20 and thus leads to an increase in material yields.

An unnecessary increase in the size of the burr 26 can also be prevented when the burr slope length L1 is less than or equal to 5 mm. As a result, the burr 26 can be prevented from, for example, breaking due to its weight. In addition, heat is easily prevented from remaining in the burr 26 during quenching after high-frequency heating. This prevents variations in hardness and quenching cracks in the friction-welded portion 20. As a result, the joint strength at the friction-welded portion 20 can be increased as well.

In the drive shaft 10 according to the above-described embodiment, the connection radius r1 is less than or equal to 3 mm, and the base radius R1 is less than or equal to 2.5 mm. In the friction-welding step S2 in the method of producing the drive shaft 10 according to the above-described embodiment, the friction-welded portion 20 is formed such that the connection radius r1 is less than or equal to 3 mm and that the base radius R1 is less than or equal to 2.5 mm.

When the connection radius r1 is less than or equal to 3 mm, an unnecessary increase in the size of the burr 26 can be prevented. This increases the joint strength at the friction-welded portion 20. Moreover, when the base radius R1 is less than or equal to 2.5 mm, the connection radius r1 of greater than or equal to 0.5 mm can be easily obtained. This also increases the joint strength at the friction-welded portion 20.

In the drive shaft 10 according to the above-described embodiment, the burr 26 includes the first curved portion 28 and the second curved portion 30, the first curved portion 28 being raised from the first inner wall surface 22a and curved away from the second inner wall surface 24a in the axial direction, the second curved portion 30 being raised from the second inner wall surface 24a and curved away from the first inner wall surface 22a in the axial direction, and when the virtual line passing through the valley bottom portion 40, which is formed between the first curved portion 28 and the second curved portion 30, in a radial direction of the first annular wall 16 and the second annular wall 18 is defined as the virtual centerline I, the axial end part 18a of the second annular wall 18 expands toward the first annular wall 16 beyond the virtual centerline I by 1 to 30 μm at the friction-welded portion 20. In this case, the friction-welded portion 20, at which the first annular wall 16 and the second annular wall 18 are firmly joined together, can be formed as described above.

According to the above-described embodiment, at least one of NbC, Mo$_2$C, and Tic deposits in the grain boundary in the metal structure of the second annular wall 18 at the friction-welded portion 20 of the drive shaft 10.

In the drive shaft 10 according to the above-described embodiment, the medium carbon steel serving as the material of the solid stub shaft 14 contains, by weight, 0.45 to 0.51% C, 0.20% or less Si, 0.30 to 0.50% Mn, 0.010% or less P, 0.008 to 0.020% S, 0.1% or less Cu, 0.1% or less Ni, 0.1 to 0.2% Cr, at least one of 0.05 to 0.25% Mo, 0.03 to 0.08% Nb, and 0.01 to 0.05% Ti, 0.02 to 0.04% Al, and 10 to 30 ppm B; the rest of the medium carbon steel consists of Fe and unavoidable impurities; and the grain size number ranges from #9 to #11.

Moreover, in the drive shaft 10 according to the above-described embodiment, the medium carbon steel serving as the material of the hollow tubular body 12 contains, by weight, 0.43 to 0.47% C, 0.30% or less Si, 0.60 to 0.90% Mn, 0.010% or less P, 0.020% or less S, 0.1% or less Cu, 0.1% or less Ni, 0.05% or less Cr, and 0.02 to 0.04% Al; the rest of the medium carbon steel consists of Fe and unavoidable impurities; and the grain size number ranges from #5 to #9.

The method of producing the drive shaft 10 according to the above-described embodiment includes, after the friction-welding step S2, the annealing step S3 of annealing the drive shaft 10 under the condition where the drive shaft 10 is maintained at a temperature of 650 to 720° C. for 30 to 90 minutes, and after the annealing, the hardening step S4 of hardening the drive shaft 10, wherein at least one of NbC, Mo$_2$C, and TiC deposits in the grain boundary in the metal structure of the solid stub shaft 14.

In the above-described cases, the Mo$_2$C, NbC, and TiC deposit in the grain boundaries prevent grain growth by the pinning effect and thereby improve the strength of the grain boundaries. As a result, the joint strength at the friction-welded portion 20 can be increased as well. Thus, when the drive shaft 10 is subjected to tensile testing, it is not the friction-welded portions 20 but the hollow tubular body 12 that breaks.

In the hardening step S4, the overall drive shaft 10 can be hardened. As a result, although the drive shaft 10 is formed by joining the hollow tubular body 12 and the solid stub shafts 14 together, the drive shaft 10 has a sufficient strength while being lightweight.

The present invention is not limited in particular to the embodiments described above, and various modifications can be made thereto without departing from the scope of the present invention.

What is claimed is:

1. A drive shaft comprising:
   a first annular wall with an annular shape provided at an end part of a hollow tubular body made of a medium carbon steel; and
   a second annular wall with an annular shape provided at an end part of a solid stub shaft made of a medium carbon steel, the first and second annular walls being joined together in an axial direction via a friction-welded portion, wherein:
   the first annular wall and the second annular wall have outer diameters of 30 to 50 mm and wall thicknesses of 3 to 5 mm;
   at the friction-welded portion, a burr is partially raised from a first inner wall surface, which is an inner wall surface of the first annular wall, and from a second inner wall surface, which is an inner wall surface of the second annular wall;
   the burr includes
      a burr base part, which is a basal end at which the burr is raised from the first inner wall surface,
      an orthogonal part, which extends in a direction orthogonal to the first inner wall surface, and
      an intermediate curved part, which curves between the burr base part and the orthogonal part;
   the burr base part includes
      a connection part, which is an end part of the burr base part adjacent to the first inner wall surface and connects the burr base part and the first inner wall surface with each other, and
      a slope part, which slopes with respect to the first inner wall surface and extends from the connection part to the intermediate curved part,
   a connection radius, which is a radius of curvature of the connection part, is greater than or equal to 0.5 mm;

a base radius, which is a minimum radius of curvature of the intermediate curved part, is greater than or equal to 0.5 mm;
a burr base angle, which is an angle of inclination of the slope part relative to the first inner wall surface, is less than or equal to 40°; and
a burr slope length, which is an axial length of the part between the burr base part and the orthogonal part, is in a range of 0.2 to 5 mm.

2. The drive shaft according to claim 1, wherein the connection radius is less than or equal to 3 mm, and
the base radius is less than or equal to 2.5 mm.

3. The drive shaft according to claim 1, wherein:
the burr includes a first curved portion and a second curved portion, the first curved portion being raised from the first inner wall surface and curved away from the second inner wall surface in the axial direction, the second curved portion being raised from the second inner wall surface and curved away from the first inner wall surface in the axial direction; and
when a virtual line passing through a valley bottom portion, which is formed between the first curved portion and the second curved portion, in a radial direction of the first annular wall and the second annular wall is defined as a virtual centerline, an axial end part of the second annular wall expands toward the first annular wall beyond the virtual centerline by 1 to 30 μm at the friction-welded portion.

4. The drive shaft according to claim 1, wherein at least one of NbC, Mo$_2$C, and TiC deposits in a grain boundary in metal structure of the second annular wall at the friction-welded portion.

5. The drive shaft according to claim 1, wherein the medium carbon steel serving as a material of the solid stub shaft contains, by weight, 0.45 to 0.51% C, 0.20% or less Si, 0.30 to 0.50% Mn, 0.010% or less P, 0.008 to 0.020% S, 0.1% or less Cu, 0.1% or less Ni, 0.1 to 0.2% Cr, at least one of 0.05 to 0.25% Mo, 0.03 to 0.08% Nb, and 0.01 to 0.05% Ti, 0.02 to 0.04% Al, and 10 to 30 ppm B; rest of the medium carbon steel consists of Fe and unavoidable impurities; and grain size number ranges from #9 to #11.

6. The drive shaft according to claim 1, wherein the medium carbon steel serving as the material of the hollow tubular body contains, by weight, 0.43 to 0.47% C, 0.30% or less Si, 0.60 to 0.90% Mn, 0.010% or less P, 0.020% or less S, 0.1% or less Cu, 0.1% or less Ni, 0.05% or less Cr, and 0.02 to 0.04% Al; rest of the medium carbon steel consists of Fe and unavoidable impurities; and grain size number ranges from #5 to #9.

7. A method of producing a drive shaft, the drive shaft comprising:
a first annular wall with an annular shape provided at an end part of a hollow tubular body made of a medium carbon steel; and
a second annular wall with an annular shape provided at an end part of a solid stub shaft made of a medium carbon steel, the first and second annular walls being joined together in an axial direction via a friction-welded portion to obtain the drive shaft,
the method comprising:
a forging step of obtaining the solid stub shaft by cold forging; and
a friction-welding step of joining the first annular wall and the second annular wall together by friction welding, the first annular wall and the second annular wall having outer diameters of 30 to 50 mm and wall thicknesses of 3 to 5 mm, wherein:
in the friction-welding step, the friction-welded portion is formed in a manner
that a burr is partially raised from a first inner wall surface, which is an inner wall surface of the first annular wall, and from a second inner wall surface, which is an inner wall surface of the second annular wall;
that the burr includes
a burr base part, which is a basal end at which the burr is raised from the first inner wall surface,
an orthogonal part, which extends in a direction orthogonal to the first inner wall surface, and
an intermediate curved part, which curves between the burr base part and the orthogonal part;
that the burr base part includes
a connection part, which is an end part of the burr base part adjacent to the first inner wall surface and connects the burr base part and the first inner wall surface with each other, and
a slope part, which slopes with respect to the first inner wall surface and extends from the connection part to the intermediate curved part,
that a connection radius, which is a radius of curvature of the connection part, is greater than or equal to 0.5 mm;
that a base radius, which is a minimum radius of curvature of the intermediate curved part, is greater than or equal to 0.5 mm;
that a burr base angle, which is an angle of inclination of the slope part relative to the first inner wall surface, is less than or equal to 40°; and
that a burr slope length, which is an axial length of the part between the burr base part and the orthogonal part, is in a range of 0.2 to 5 mm.

8. The method of producing the drive shaft according to claim 7, wherein in the friction-welding step, the friction-welded portion is formed in a manner that the connection radius is less than or equal to 3 mm and that the base radius is less than or equal to 2.5 mm.

9. The method of producing the drive shaft according to claim 7, further comprising:
after the friction-welding step, an annealing step of annealing the drive shaft under a condition where the drive shaft is maintained at a temperature of 650 to 720° C. for 30 to 90 minutes; and
after the annealing, a hardening step of hardening the drive shaft, wherein:
at least one of NbC, Mo$_2$C, and TiC deposits in a grain boundary in metal structure of the solid stub shaft.

* * * * *